United States Patent
Maeda et al.

(10) Patent No.: US 9,282,522 B2
(45) Date of Patent: Mar. 8, 2016

(54) COMMUNICATION APPARATUS AND COMMUNICATION METHOD

(71) Applicant: Kabushiki Kaisha Toshiba, Minato-ku (JP)

(72) Inventors: Kenichi Maeda, Kamakura (JP); Arata Miyamoto, Ohta-ku (JP); Masahiro Ishiyama, Kawasaki (JP); Hiroto Nakai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 101 days.

(21) Appl. No.: 14/207,969

(22) Filed: Mar. 13, 2014

(65) Prior Publication Data

US 2015/0071156 A1  Mar. 12, 2015

(30) Foreign Application Priority Data

Sep. 10, 2013 (JP) ................. 2013-187598

(51) Int. Cl.
| | |
|---|---|
| *H04H 20/71* | (2008.01) |
| *H04W 52/24* | (2009.01) |
| *H04L 12/18* | (2006.01) |
| *H04W 52/38* | (2009.01) |
| *H04W 52/48* | (2009.01) |

(52) U.S. Cl.
CPC ........... *H04W 52/243* (2013.01); *H04L 12/189* (2013.01); *H04W 52/38* (2013.01); *H04W 52/48* (2013.01)

(58) Field of Classification Search
None
See application file for complete search history.

(56) References Cited

U.S. PATENT DOCUMENTS

| | | | | |
|---|---|---|---|---|
| 2009/0323697 | A1* | 12/2009 | Celentano et al. | 370/395.42 |
| 2012/0322502 | A1* | 12/2012 | Song et al. | 455/553.1 |
| 2013/0077477 | A1* | 3/2013 | Daraiseh et al. | 370/225 |
| 2014/0036898 | A1* | 2/2014 | Liu | 370/338 |

FOREIGN PATENT DOCUMENTS

| | | |
|---|---|---|
| JP | 2006-254155 | 9/2006 |
| JP | 2009-225043 | 10/2009 |
| WO | WO 2009/113137 | 9/2009 |

OTHER PUBLICATIONS

Japanese Office Action mailed Dec. 22, 2015 for Japanese Patent Application No. 2013-187598, with English translation of relevant portions thereof.

* cited by examiner

*Primary Examiner* — Phirin Sam
(74) *Attorney, Agent, or Firm* — Oblon, McClelland, Maier & Neustadt, L.L.P.

(57) ABSTRACT

According to the embodiments, when a communication apparatus is a publisher, a transmission message including a first identifier is transmitted using first transmission power, when the communication apparatus is a subscriber, data of a reception message including the first identifier is stored in a nonvolatile memory, when at least a part of the reception message cannot be received, a repair message for requesting retransmission of the reception message is transmitted from a wireless interface unit using second transmission power, and when there is no response, a repair message is transmitted using third transmission power that is larger than the second transmission power.

18 Claims, 7 Drawing Sheets

COMMUNICATION APPARATUS AND COMMUNICATION METHOD

CROSS-REFERENCE TO RELATED APPLICATIONS

This application is based upon and claims the benefit of priority from the prior Japanese Patent Application No. 2013-187598, filed on Sep. 10, 2013; the entire contents of which are incorporated herein by reference.

FIELD

Embodiments described herein relate generally to a communication apparatus and a communication method.

BACKGROUND

As a communication method in wireless communication, there is a Peer-to-Peer (P2P) communication method in which data is directly transmitted and received between terminals without via any access points such as the Internet or an intranet. Because any communication infrastructure is not required for P2P communication, the method can be used in any location and the communication channel can be minimized, thereby leading to reduction of the latency of the communication. Furthermore, when terminals are proximate to each other, communication can be made with small power consumption using a communication signal with a small output.

When a plurality of communication apparatuses performs wireless communication as these apparatuses are proximate to each other, interference of wireless signals becomes a problem.

DETAILED DESCRIPTION

In general, according to one embodiment, a communication apparatus includes a wireless interface unit, an operation-mode storing unit, an identification-information storing unit that stores therein a first identifier indicating that the communication apparatus belongs to a first group, a message processing unit that generates a message to be transmitted and analyzes a message to be received, a transmission-power decision unit that decides transmission power when a message is transmitted, and a nonvolatile memory, and when the communication apparatus is determined to be a publisher based on a mode stored in the operation-mode storing unit, a transmission message including the first identifier is output by the wireless interface unit to outside of the communication apparatus using first transmission power, when the communication apparatus is determined to be a subscriber based on a mode stored in the operation-mode storing unit, it is determined whether the first identifier is included in a reception message received by the wireless interface unit, and when it is determined that the first identifier is included in the reception message, data included in the reception message is stored in the nonvolatile memory, and when it is determined that the first identifier is not included in the reception message, the data included in the reception message is not stored in the nonvolatile memory, and when the communication apparatus is a subscriber and when at least a part of the reception message cannot be received, a repair message for requesting retransmission of at least a part of the reception message is output from the wireless interface unit to outside of the communication apparatus using second transmission power, and when there is no response from outside of the communication apparatus to the repair message, the repair message is output from the wireless interface unit to outside of the communication apparatus using third transmission power that is larger than the second transmission power.

Exemplary embodiments of a communication apparatus and a communication method will be explained below in detail with reference to the accompanying drawings. The present invention is not limited to the following embodiments.

First Embodiment

Figure 1:
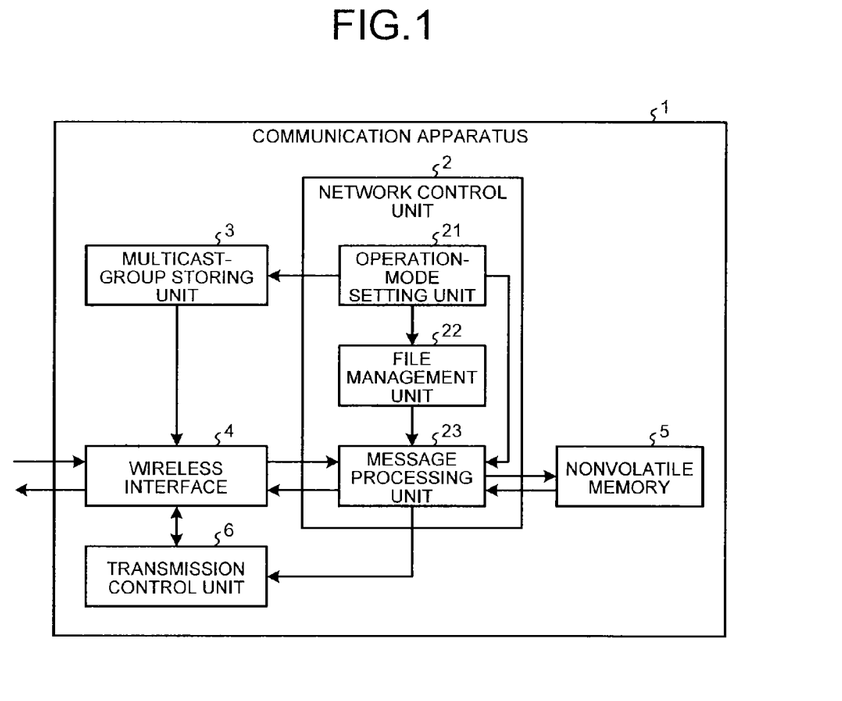
FIG. 1 is a block diagram illustrating a configuration example of a communication apparatus according to a first embodiment.

FIG. 1 is a block diagram illustrating a configuration example of a communication apparatus 1 according to a first embodiment. The communication apparatus 1 includes a network control unit 2, a multicast-group storing unit (identification-information storing unit) 3, a wireless interface 4, a nonvolatile memory 5, and a transmission control unit 6.

The communication apparatus 1 according to the first embodiment can transmit and receive data with another communication apparatus 1 with an identical configuration by P2P communication. The communication apparatus 1 can also perform unicast communication with another communication apparatus 1, and can transmit the same data to a plurality of other communication apparatuses 1 by multicast.

The wireless interface 4 performs a reception process of a wireless signal, and when a received signal is a message to the interface itself, the wireless interface 4 outputs the message to the network control unit 2. Furthermore, the wireless interface 4 transmits a message generated by the network control unit 2 as a wireless signal by performing a transmission process. As the transmission process, for example, modulation or error correcting code processing is performed on a signal. As the reception process, a process corresponding to a transmission process (for example, demodulation is performed when a signal is modulated by the transmission process, and decoding is performed when error correcting code processing is performed) is performed. The wireless interface 4 performs a transfer process for realizing P2P communication by a plurality of communication apparatuses 1. While there is no restriction on a protocol and the like for realizing the P2P communication, for example, an IP (Internet Protocol) can be used.

The multicast-group storing unit 3 holds a list of identifiers of a multicast group to which the unit itself belongs. The multicast-group storing unit 3 notifies identifiers of the multicast group to which the unit itself belongs to the wireless interface 4. The wireless interface 4 determines that a message in which a multicast address corresponding to an identifier of the multicast group to which the interface itself belongs is stored in a destination is also a message to the interface itself. The nonvolatile memory 5 holds data to be transmitted, received data, and the like. The network control unit 2 includes an operation-mode setting unit 21, a file management unit 22, and a message processing unit 23.

The transmission control unit 6 controls any one or both of transmission power and a transmission speed when a signal is transmitted to the wireless interface 4. The transmission power is power of a radio wave when the wireless interface 4 transmits a wireless signal as a radio wave. The transmission speed is also referred to as "transfer rate" or "transmission rate", and for example, it is represented by the number of bits transmittable per second. As the controlling method of the transmission speed, for example, control of a frequency bandwidth used by the wireless interface 4, selection of a modulation method (such as selection of a modulation level), and control of a code rate in the error correcting code processing can be carried out. The controlling method of the transmission speed is not limited to these examples, and can be any method.

In exchanges of data between mobile devices, there is a case where the same data is transmitted to a plurality of terminals. In this case, one-to-many data transfer occurs. If communication efficiency is not considered, it is conceivable that one-to-one communication is repeated by the number of reception terminals. However, repetitive transmission of the same data leads to redundancy and an increase of the time required for the data transfer, and a frequency range will be unnecessarily occupied for a long time.

To avoid this, it suffices to use one-to-many multicast communication instead of one-to-one unicast communication. However, in the case of multicast communication, when a reception terminal misses a fragment of certain data, it is not possible to retransmit the data for the reception terminal while data transfer from the transmission terminal is interrupted. Digital television broadcast, IP broadcast, and the like do not have a mechanism of data retransmission, because media data of these types of broadcast has a data structure such that its transmission process is not disrupted if a certain data area of the media data is missing. When handling of data with an arbitrary format is considered, even one bit of its reception file cannot be missed. Therefore, in the first embodiment, a retransmission process of data is performed in order to prevent missing of data at the reception side while transmission of data is continued by multicast communication.

In the first embodiment, when the same data is transmitted to a plurality of other communication apparatuses 1, transmission and reception of data are managed by multicast groups. The multicast groups belong to the same logical network and are an assembly of the communication apparatuses 1, which are in a relationship of transmitting and receiving data with each other. In the first embodiment, when the same data is transmitted to a plurality of other communication apparatuses 1, a communication apparatus 1 that serves as a data transmission source, that is, a transmission source apparatus, is referred to as "publisher (transmission source)", and communication apparatuses 1 other than the publisher are referred to as "subscriber (reception side)". The subscriber receives data from the publisher directly or via another communication apparatus 1. One communication apparatus 1 that serves as a publisher is set for one multicast group.

The operation-mode setting unit 21 (operation-mode storing unit) of the network control unit 2 sets whether the apparatus itself (the communication apparatus 1) operates in a publisher mode or a subscriber mode. The operation-mode setting unit 21 also sets multicast groups to which the apparatus itself belongs. The setting of multicast groups is explained later. The operation mode can be set individually for each of the multicast groups. For example, it is possible to set such that one communication apparatus 1 serves as a publisher in a certain multicast group and also severs as a subscriber in other multicast groups. The operation-mode setting unit 21 controls the file management unit 22 and the message processing unit 23 such that these units perform operations corresponding to the operation mode of each of the multicast groups.

When the communication apparatus 1 operates as a publisher, the file management unit 22 generates a ToC (Table of Contents) (contents information) of a file group, which is a transmitting item to subscribers. In the first embodiment, a chunk of data to be transmitted from a publisher to subscribers is referred to as "file". The file can be any type of data file. For example, it can be a text file, or an image or picture data file. The publisher transmits one or more files by a series of messages. The file management unit 22 generates a ToC having stored therein information related to files corresponding to the series of messages before transmitting the series of messages. Furthermore, the file management unit 22 decomposes a file into pieces of unit data used at retransmission, where each of the pieces of unit data is referred to as "chunk (divided data)", and a unique identifier is allocated to each chunk. In the ToC, identifiers of files and a list of chunks constituting the files are included on a file-by-file basis. The list of chunks constituting these files is, for example, a list of identifiers of chunks. The first embodiment is not limited thereto and, when an identifier of a series of chunks is allocated to one file, the list of chunks constituting the file (hereinafter, "chunk list") can be, for example, information indicating an area of the identifier of chunks to be transmitted. The message processing unit 23 generates a message having stored therein a ToC (a ToC message). The wireless interface 4 transmits the ToC message as a wireless signal.

When the communication apparatus 1 operates as a subscriber, the file management unit 22 holds a chunk list having been notified from a ToC.

The message processing unit 23 generates a message in which data to be transmitted to other communication apparatuses 1 is formed in a certain format, and transmits the message to the wireless interface 4. The wireless interface 4 then receives the message that is received from other communication apparatuses 1, and a process corresponding to the contents of the message is performed.

When the communication apparatus 1 operates as a publisher, the message processing unit 23 generates a data message having stored therein data (data constituting a file) held in the nonvolatile memory 5. Furthermore, when the communication apparatus 1 operates as a publisher, the message processing unit 23 performs a retransmission process (explained later) based on a repair message (explained later) received from a subscriber. In the first embodiment, while an example in which a publisher transmits data held in the nonvolatile memory 5 to a subscriber is explained, this embodiment can be also applicable to a case of transmitting data received via a wired or wireless line or data stored in other external storage media.

When the communication apparatus 1 operates as a subscriber, the message processing unit 23 extracts data from a data message received from another communication apparatus 1, and stores the extracted data in the nonvolatile memory 5. When the message processing unit 23 has received a ToC, the message processing unit 23 holds a chunk list stored in the ToC. Furthermore, when the communication apparatus 1 operates as a subscriber, if there is a data message having failed to be received, the message processing unit 23 generates a repair message and passes the message to the wireless interface 4.

The data message is a message including a chunk that is a fragment of file data to be transmitted from a publisher to subscribers. One or more chunks are included in one data message. One chunk includes a byte stream that is an entity of the chunk and an identifier of the chunk. In addition to these elements, other pieces of information can be also included in the chunk.

When the size of the chunk is too large to be transmitted as one data message, the chunk can be divided into even smaller pieces of unit data, which are referred to as "sector". In this case, while the data message is transmitted in the unit of sectors, a request of retransmission is made in the unit of chunks. In this case, the data message includes one or more sectors. The sector includes a byte stream that is an entity of the sector and an identifier of the sector. The identifier of the sector is formed by a pair of an identifier of a chunk that includes the sector and an index from the top on the chunk of the sector. Similarly to file messages, the publisher decomposes a ToC into chunks or sectors and transmits the chunks or sectors as data messages.

Figure 2:
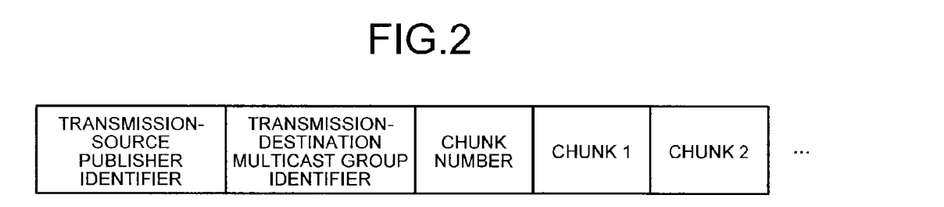
FIG. 2 is a diagram illustrating a configuration example of a data message according to the first embodiment.

FIG. 2 is a diagram illustrating a configuration example of a data message according to the first embodiment. FIG. 2 illustrates an example of transmitting a data message in the unit of chunks. As shown in FIG. 2, a transmission-source publisher identifier as information indicating a transmission source is stored in the data message and a transmission-destination multicast group identifier as information indicating a destination is also stored in the data message. Next, a chunk number indicating the number of chunks to be transmitted in the data message is stored, and then respective chunks (chunk 1, chunk 2, and the like) are stored. When the data message is transmitted in the unit of sectors, the chunk number shown in FIG. 2 is replaced by a sector number, and respective sectors are stored in the data message instead of respective chunks.

Furthermore, when data messages are generated, it suffices that the communication apparatus 1 calculates a redundant part (redundant information) for error detection using chunk data for every chunk of the respective data messages, and transmits the calculated redundant part as it is stored in the data messages. In this case, when a subscriber receives a data message, the message processing unit 23 determines whether each chunk has been received normally, and when there is a chunk that has not been received normally, retransmission of the chunk is requested.

A repair message is a message transmitted from a subscriber to a publisher. The repair message is used by the subscriber to instruct the publisher as to which chunk is requested to transmit (to retransmit). The repair message includes a chunk identifier of a chunk for which the subscriber requests retransmission. When the publisher receives a repair message, as a retransmission process, a chunk corresponding to the chunk identifier included in the repair message is transmitted at a certain timing.

Figure 3:
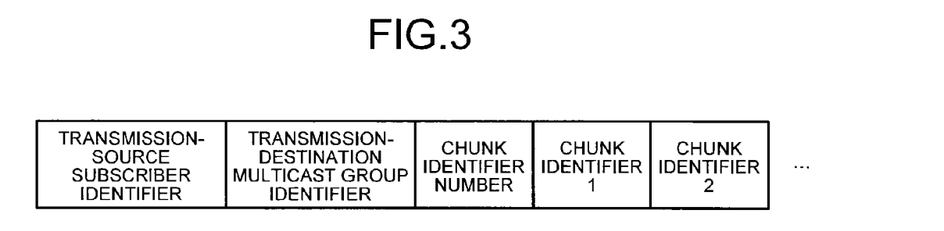
FIG. 3 is a diagram illustrating a configuration example of a repair message according to the first embodiment.

FIG. 3 is a diagram illustrating a configuration example of a repair message according to the first embodiment. The repair message includes a list of identifiers of chunks that are supposed to be transmitted. As shown in FIG. 3, a transmission-source subscriber identifier as information indicating a transmission source is stored in the repair message and a transmission-destination multicast group identifier as information indicating a destination is also stored in the repair message. In the information indicating a destination, a transmission-destination publisher identifier can be stored instead of a transmission-destination multicast group identifier. Next, a chunk identifier number indicating the number of identifiers of chunks that are requested to be transmitted by the repair message is stored, and then identifiers of respective chunks requested to be transmitted are stored. To reduce the amount of data of chunk identifiers designated in the repair message, consecutive chunk identifiers included in the same file can be compressed by a compression method such as run-length encoding.

Next, data-message transmission of a publisher is explained. First, a publisher sequentially transmits a ToC and a series of data messages. As described above, the series of data messages are data messages to which file information is notified by a ToC, and are a plurality of data messages in which data (chunks) of one or more files are stored. Specifically, the file management unit 22 determines a transmission order of chunks to be transmitted and instructs the transmission order from the top chunk to the tail chunk to the message processing unit 23. The message processing unit 23 sequentially generates a data message having stored therein one or more chunks based on the transmission order. The wireless interface 4 transmits the generated data message.

Figure 4:
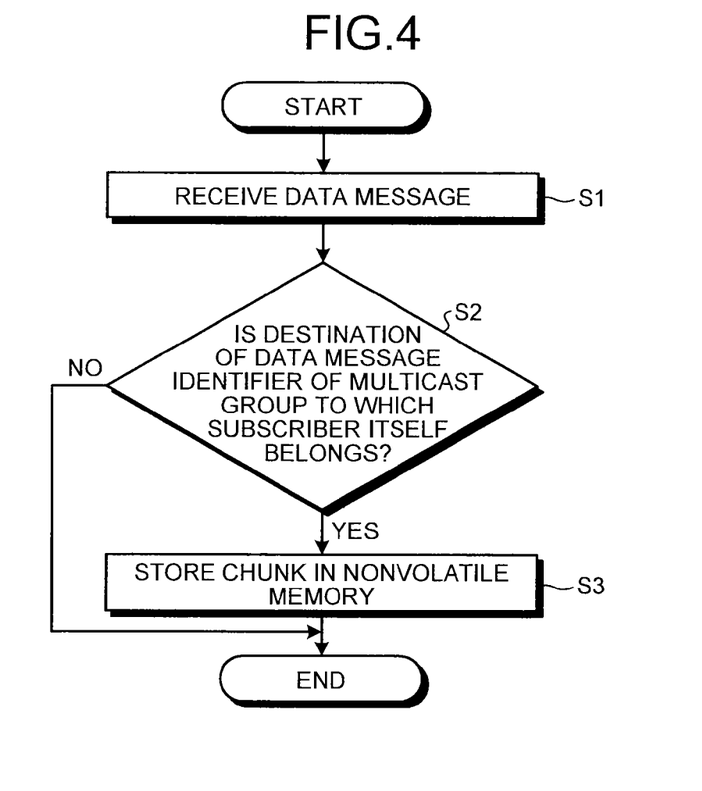
FIG. 4 is a flowchart illustrating an example of an operation of a subscriber that has received a data message.

FIG. 4 is a flowchart illustrating an example of an operation of a subscriber that has received a data message. When a subscriber receives a data message (Step S1), it is determined whether the destination of the data message is the identifier of a multicast group to which the subscriber itself belongs (Step S2). When the destination of the data message is the identifier of the multicast group to which the subscriber itself belongs (Yes at Step S2), the data message (specifically, a chunk stored in the data message) is stored in the nonvolatile memory 5 (Step S3) and the process is ended. At Step S3, there is a case where the data message is not stored in the nonvolatile memory 5, and a chunk included in the data message is extracted on a RAM (not shown) and a predetermined process is performed on the extracted chunk. When the destination of the data message is not the identifier of the multicast group to which the subscriber itself belongs (No at Step S2), the data message is not stored in the nonvolatile memory 5 and the process is ended.

Meanwhile, as the subscriber receives a data message transmitted from the publisher and when there is a chunk having failed to be received, a repair message is transmitted. Specifically, the file management unit 22 of the subscriber compares a chunk list notified from a ToC and a chunk identifier of a chunk that has been received normally to determine whether there is any chunk that has not been received normally. When there is a chunk that has not been received normally, the identifier of the chunk is notified to the message processing unit 23, and the message processing unit 23 generates a repair message having stored therein the notified chunk identifier. The wireless interface 4 transmits the generated repair message.

As the publisher receives the repair message, the publisher temporarily stops an operation of sequentially transmitting chunks and responds to the repair message. Specifically, the publisher transmits a chunk corresponding to an identifier of a chunk included in the repair message by a data message. The publisher resumes temporarily stopped transmission of a series of data messages after responding to the repair message. Furthermore, in a case where the publisher receives a repair message during transmission of a series of data messages, when a certain condition is met, the transmission of the series of data messages can be continued even if the publisher receives the repair message. The subscriber retransmits a repair message when it has not received data for which retransmission is requested within a predetermined period of time after transmitting the repair message. Furthermore, after ending the transmission of the series of data messages, the publisher responds to a repair message when it has received the repair message, regardless of whether a certain condition is met.

In the above descriptions, an operation in which a publisher performs retransmission of chunks has been explained. Meanwhile, when there is a plurality of subscribers that participates in a multicast group, there is a case where a chunk requesting retransmission of a certain subscriber is received normally and held by another adjacent subscriber. In this case, in the first embodiment, effective use of wireless resources is realized by retransmitting chunks from another subscriber. Therefore, in the repair message format shown in FIG. 3, the destination of the second item is designated as a multicast group identifier. Alternatively, it is also possible to perform a process in which, in a repair message, its address is designated as a publisher identifier of a transmission destination, and respective subscribers also receive a repair message addressed to a publisher and transmit chunks.

Figure 5:
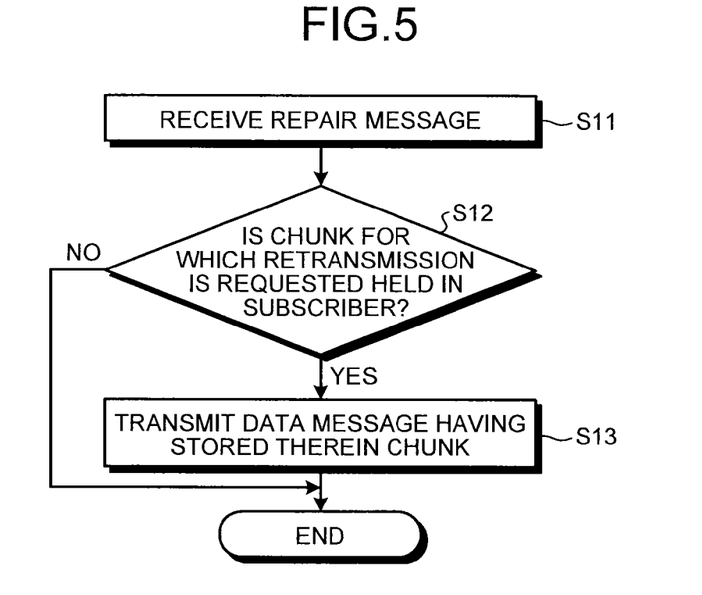
FIG. 5 is a diagram illustrating an example of a response procedure of a subscriber to a repair message.

FIG. 5 is a diagram illustrating an example of a response procedure of a subscriber to a repair message. When a subscriber receives a repair message from another subscriber (Step S11), it is determined that the subscriber itself holds chunks requested by the repair message (Step S12). The determination is made by the message processing unit 23, for example. When the message processing unit 23 holds at least one of the chunks requested by the repair message (Yes at Step S12), the message processing unit 23 generates a data message having stored therein the held chunks and transmits the data message as a response to the repair message to the subscriber of a transmission source of the repair message via the wireless interface 4 (Step S13). The destination of the data message is the subscriber of the transmission source of the repair message. When the message processing unit 23 does not hold even one of the chunks requested by the repair message (No at Step S12), the repair message is not responded to and the process is ended.

The multicast group according to the first embodiment is explained next. In the first embodiment, a publisher transmits a data message by multicast, and all apparatuses within a reachable area receive the data message. The publisher and a corresponding subscriber do not always sense each other's presence, and thus it is not necessary to establish an explicit connection between them. When a normal message is transmitted by multicast, a transmission-source apparatus does not guarantee that the message is correctly delivered to a reception-side apparatus, and does not confirm whether the message has been delivered to the reception-side apparatus. On the other hand, in the first embodiment, when reception of a data message has failed, a retransmission process is performed asynchronously using a repair message. By performing the retransmission process, even when data is transmitted by multicast, it is possible to prevent missing of data at the reception side.

As an example of transmitting a data message by multicast, there is a method of using IP multicast. A common multicast address is allocated to a publisher and all subscribers participating in the same multicast group. In this case, as the multicast group identifier shown in FIG. 2, a multicast address can be used. When a message is transmitted to the multicast address, the message is delivered to all the apparatuses in the same multicast group. Meanwhile, even when there are apparatuses participating in a different multicast group, because a mutually different multicast address is allocated to these groups, there is no possibility that each other's message is wrongly delivered.

When data transmission from a publisher using multicast and retransmission using a repair message described above are performed, depending on the number and positions of communication apparatuses 1 participating in a multicast group, there is a possibility that a repair message and a data message used in a retransmission process interfere with each other. To avoid such interference, it is conceivable that the communication apparatuses 1 perform transmission in a time-division manner; however, in this case, the number of subscribers that request retransmission cannot be estimated in advance. Therefore, it is difficult to perform scheduling of transmission in a time-division manner.

Accordingly, in the first embodiment, in repair message transmission, the influence of interference is reduced by executing transmission control. A first method of transmission control is transmission power control. In the repair message transmission, the reachable area of a radio wave transmitted from the communication apparatus 1 is narrowed by decreasing transmission power.

Figure 6:
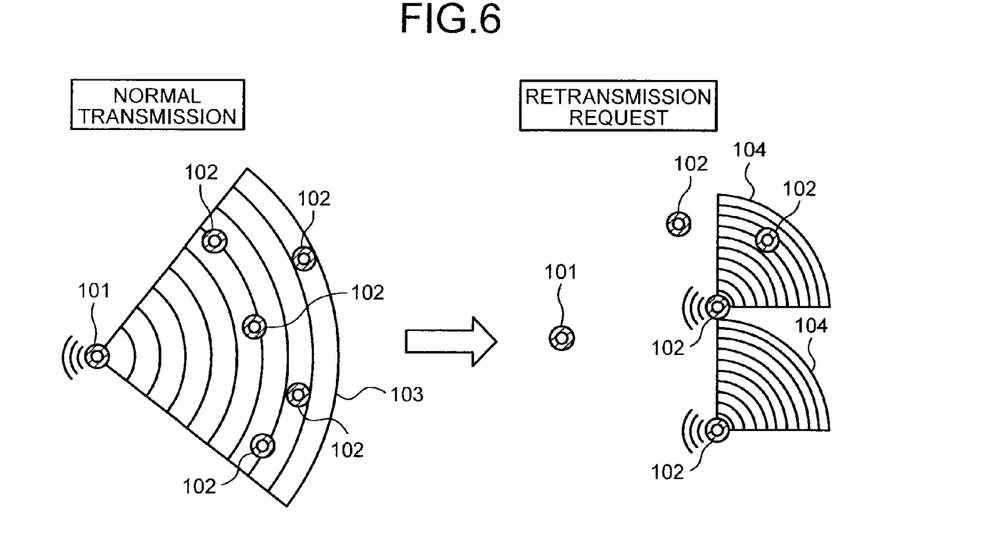
FIG. 6 is a diagram illustrating a concept of a difference in reachable areas of a radio wave in normal transmission and a retransmission request in the first embodiment.

FIG. 6 is a diagram illustrating a concept of a difference in reachable areas of a radio wave in normal transmission and a retransmission request (transmission of a repair message) in the first embodiment. On the left side of FIG. 6, there is shown an example in which a publisher 101 transmits a data message to subscribers 102, where the data message is not a retransmitted message. A reachable area 103 represents a reachable area of a radio wave (a wireless signal) when a data message is transmitted from the publisher 101. Normal transmission is transmission of messages other than repair messages. At the time of transmitting a data message by multicast from the publisher 101, because it is preferable to transmit the data message to many subscribers, the radio wave is transmitted such that its reachable area is set to be wide to some extent. On the right side of FIG. 6, there is shown a state where the subscribers 102 transmit a repair message. A reachable area 104 represents a reachable area of a radio wave when a repair message is transmitted from the subscribers 102. In the first embodiment, when there is a neighboring subscriber that holds a chunk for which retransmission is requested, the subscriber can transmit the chunk that corresponds to a repair message. Accordingly, as shown in FIG. 6, even when the reachable area of a radio wave at the time of transmitting a repair message is narrowed more than that at the time of the normal transmission, there is a possibility that subscribers to which a radio wave reaches can transmit a data message that corresponds to the repair message. If the reachable area of the radio wave can be narrowed, interference to other communication apparatuses 1 can be avoided. Furthermore, power consumption can be reduced by decreasing transmission power. In this example, the radio wave output from the publisher 101 and/or the subscribers 102 can be either a radio wave having directionality or that without directionality. When the radio wave does not have directionality, in FIG. 6, the radio wave output from the publisher 101 and/or the subscribers 102 propagates in a concentric manner.

Specifically, the transmission control unit 6 of the communication apparatus 1 executes control such that, for example, the same repair message is transmitted as the transmission power is sequentially increased from a minimum value. Subsequently, when a response to the repair message is obtained, the transmission of the repair message is ended.

Figure 7:
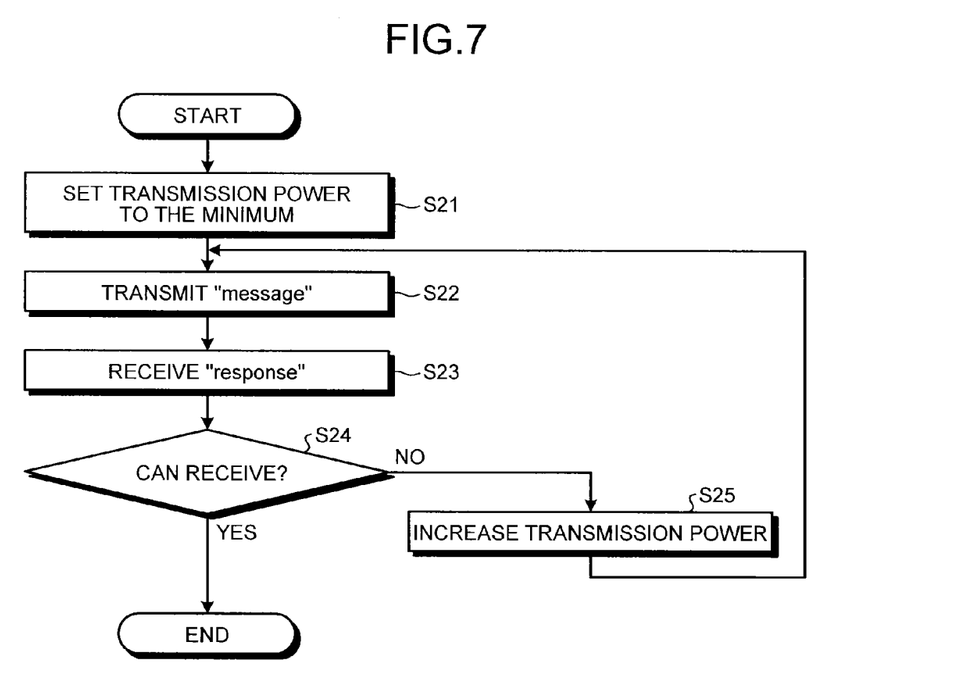
FIG. 7 is a diagram illustrating an example of a transmission-power control procedure in the first embodiment when a repair message is transmitted.

FIG. 7 is a diagram illustrating an example of a transmission-power control procedure in the first embodiment when a repair message is transmitted. First, the transmission control unit 6 sets transmission power instructed to the wireless interface 4 to a minimum value (Step S21). The wireless interface 4 transmits a message (a repair message) with the instructed transmission power (Step S22).

The wireless interface 4 receives a response to a message transmitted at Step S22 (Step S23). When the response is received normally, the wireless interface 4 notifies the fact to the transmission control unit 6. Upon reception of the response as a wireless signal, the wireless interface 4 performs a reception process such as demodulation and decoding. Even when the wireless interface 4 receives a wireless signal of a response, there is a case where, in the reception process, it is determined that the contents of the response have not been received normally. When it is determined that the contents of the response have not been received normally, the wireless interface 4 notifies the transmission control unit 6 the fact that the response has not been received. Meanwhile, when no response has been received within a predetermined period of time since a message is transmitted at Step S22, the wireless interface 4 notifies the transmission control unit 6 the fact that the response has not been received. In this example, the response to a repair message is a data message having stored therein a chunk for which retransmission is requested by a repair message.

The transmission control unit 6 determines whether the response has been received normally (Step S24), and when the response has been received normally (Yes at Step S24), the transmission control is ended. When the response has not been received normally (No at Step S24), the transmission control unit 6 increases the transmission power instructed to the wireless interface 4 (Step S25), and the process returns to Step S22. If a response (a repair message) has not been received even when the transmission power is increased to a maximum value, it suffices that, for example, processes from Step S21 are performed once again, or the maximum transmission power is set and the transmission power control is ended.

In the processes described above, the communication apparatus 1 can transmit a repair message with a minimum transmission power, by which a data message as a response can be received. For example, when there is another subscriber that is present nearer than a publisher holds a chunk for which retransmission is requested by a repair message, it is possible that a data message can be received with transmission power that is lower than that of a case where repair message is transmitted to the publisher. Accordingly, it is possible to reduce the influence on other communication apparatuses 1 and also to decrease consumed power.

Furthermore, it is conceivable that the influence of interference is reduced by changing a transmission speed (a transfer speed). Generally, as the transmission speed becomes faster, a modulation level becomes higher or a code rate in error correction is decreased, for example, so that the communication apparatus 1 is more influenced by interfering waves and noises, whereby errors tend to occur. When the intensity of a transmission signal (a radio wave) is decreased, the influence of interfering waves and noises relatively becomes larger, and thus, on average, the area where the radio wave can be received normally becomes narrower as the transmission speed becomes faster. Furthermore, depending on the characteristics of communication apparatuses 1, if there is any difference in transfer speeds that correspond to the wireless interface 4, generally, the number of corresponding communication apparatus 1 becomes more as the transfer speed is slower, and thus the probability of obtaining a response from a neighboring subscriber becomes higher as the transmission speed is slower.

Further, to enhance the speed of the transmission and reception process, the transmission speed is preferable to be faster. Therefore, for example, it is controlled such that the same repair message is transmitted as the transmission speed is sequentially decreased from its maximum value. Subsequently, when a response to the repair message is obtained, the transmission of the repair message is ended. With this process, a repair message can be transmitted with a maximum transmission speed that is within a range where the message can be received normally.

Figure 8:
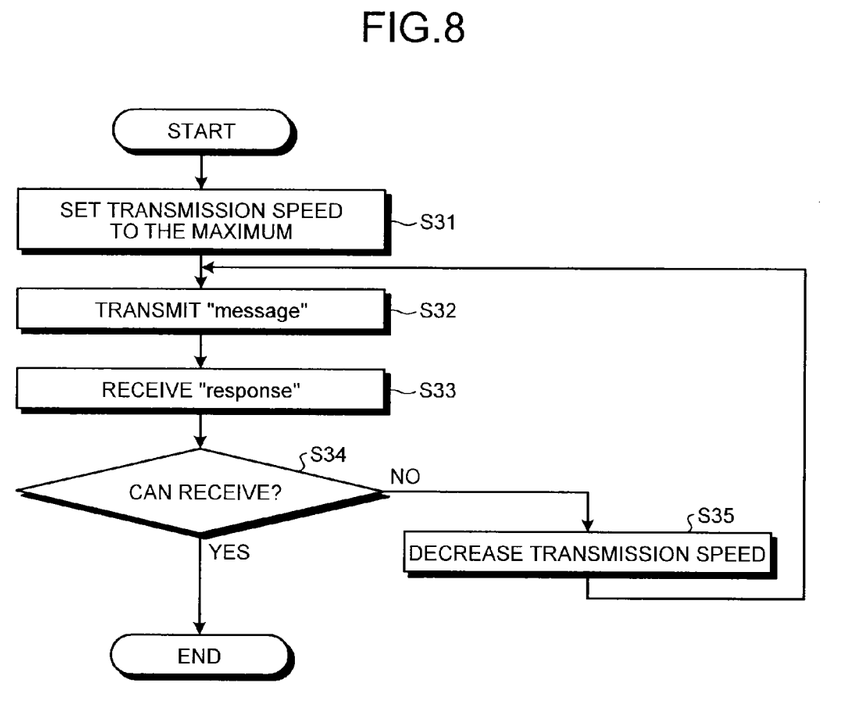
FIG. 8 is a diagram illustrating an example of a transmission-speed control procedure in the first embodiment when a repair message is transmitted.

FIG. 8 is a diagram illustrating an example of a transmission-speed control procedure in the first embodiment when a repair message is transmitted. First, the transmission control unit 6 sets a transmission speed instructed by the wireless interface 4 to a maximum value (Step S31). The wireless interface 4 transmits a message (a repair message) with the instructed transmission speed (Step S32).

The wireless interface 4 receives a response to the message transmitted at Step S32 (Step S33). When the response has been received normally, the wireless interface 4 notifies the fact to the transmission control unit 6. Similarly to the case of the transmission power control, when it is determined that the contents of the response have not been received normally, the wireless interface 4 notifies the transmission control unit 6 the fact that the response has not been received. Furthermore, when no response has been received within a predetermined period of time since a message is transmitted at Step S32, the wireless interface 4 notifies the transmission control unit 6 the fact that the response has not been received.

The transmission control unit 6 determines whether the response has been received normally (Step S34), and when the response has been received normally (Yes at Step S34), the transmission control is ended. When the response has not been received normally (No at Step S34), the transmission control unit 6 decreases the transmission speed instructed to the wireless interface 4 (Step S35), and the process returns to Step S32. If a response (a data message) has not been received even when the transmission speed is decreased to a minimum value, it suffices that, for example, processes from Step S31 are performed once again.

While there is no restriction on the timing when the transmission speed control is executed, for example, the transmission control described above is executed at every predetermined period of time. By executing the transmission control at every predetermined period of time, even when the environment of wireless communication is changed due to reasons such as movement of the communication apparatus 1 or an increase of the number of the communication apparatus 1, appropriate transmission power or transmission speed can be used.

In the first embodiment, it is configured that the transmission control unit 6 operates as a transmission-power decision unit that decides the transmission power and also operates as a transmission-speed decision unit that decides the transmission speed; however, the transmission-power decision unit and the transmission-speed decision unit can be provided separately.

In the processes described above, it is configured that the wireless interface 4 determines whether a response has been received normally. However, the first embodiment is not limited thereto, and at the time of generating data messages, when a redundant part is added to each chunk of respective data messages, it is possible to configure that the message processing unit 23 determines whether each chunk has been received normally using the redundant part, and retransmission of a repair message is requested again only for chunks that have not been received normally.

Figure 9:
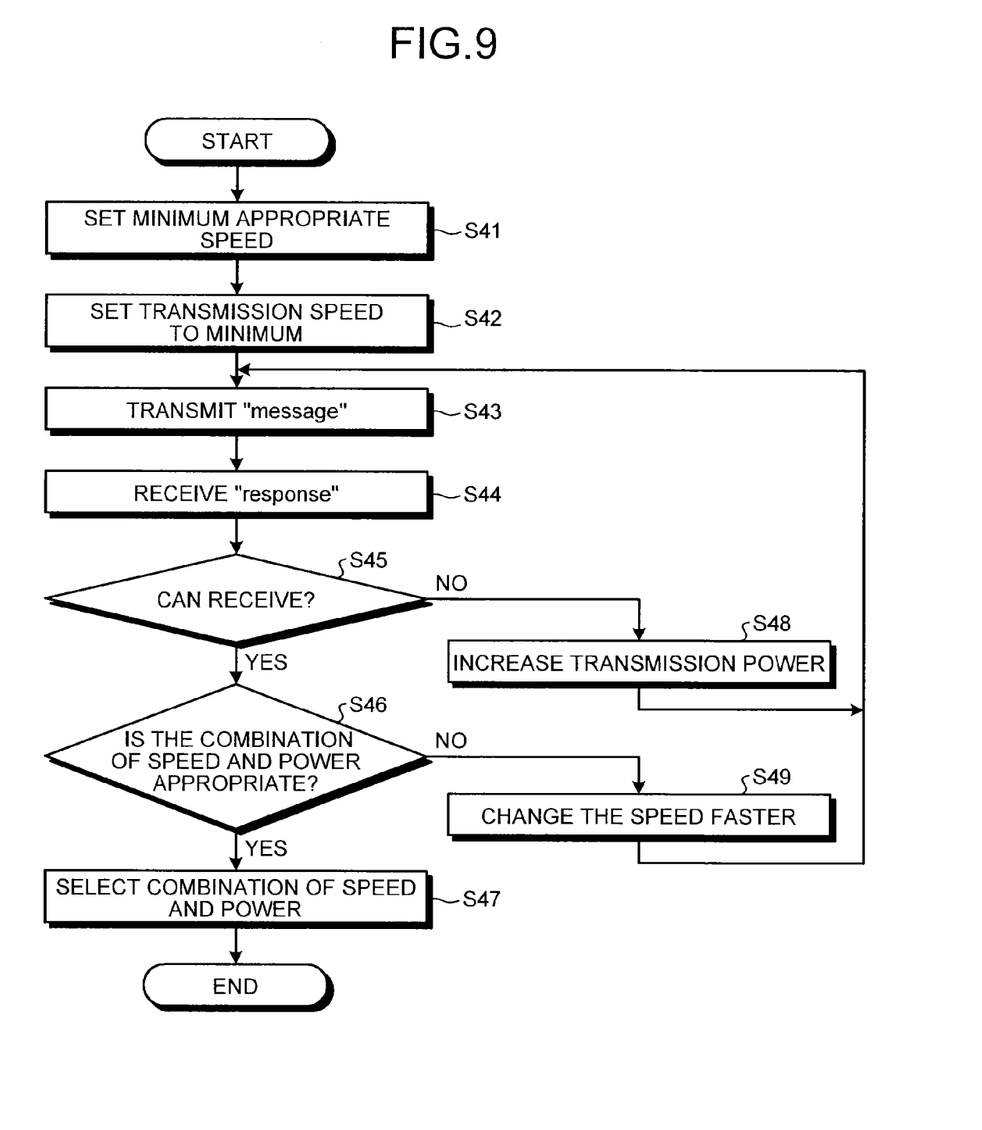
FIG. 9 is a diagram illustrating an example of a repair-message transmission control procedure when both transmission power and a transmission speed are controlled.

Furthermore, because the transmission power and the transmission speed are closely related to each other, it is also possible to execute transmission control where these elements are combined with each other. FIG. 9 is a diagram illustrating an example of a repair-message transmission control procedure when both the transmission power and the transmission speed are controlled. First, the transmission control unit 6 sets a transmission speed instructed to the wireless interface 4 to a minimum value among a plurality of candidate values (Step S41). The plurality of candidate values is set in advance. The transmission control unit 6 sets transmission power instructed to the wireless interface 4 to a minimum value (Step S42). The wireless interface 4 transmits a message (a repair message) with the instructed transmission speed and transmission power (Step S43).

The wireless interface 4 receives a response to the message transmitted at Step S43 (Step S44). When the response has been received normally, the wireless interface 4 notifies the fact to the transmission control unit 6. Similarly to the case of the transmission power control, when it is determined that the contents of the response have not been received normally, the wireless interface 4 notifies the transmission control unit 6 the fact that the response has not been received. Furthermore, when no response has been received within a predetermined period of time since a message is transmitted at Step S43, the wireless interface 4 notifies the transmission control unit 6 the fact that the response has not been received.

The transmission control unit 6 determines whether the response has been received normally (Step S45), and when the response has been received normally (Yes at Step S45), it is determined whether a combination between the transmission power and the transmission speed is permitted (Step S46). When the combination between the transmission power and the transmission speed is permitted (Yes at Step S46), currently set transmission power and transmission speed are selected (setting is left as it is) (Step S47), and the transmission control is ended.

When the response has not been received normally at Step S45 (No at Step S45), the transmission control unit 6 increases the transmission power instructed to the wireless interface 4 (Step S48), and the process returns to Step S43. If a response has not been received even when the transmission power is increased to a maximum value, it suffices that the process proceeds to Step S44 after Step S43, or processes from Step S46 are performed once again.

When the combination between the transmission power and the transmission speed is not permitted at Step S46 (No at Step S46), the transmission control unit 6 changes the transmission speed instructed to the wireless interface 4 to a candidate value that is faster than the plurality of candidate values mentioned above (Step S49), and the process returns to Step S43.

In the above processes, it is possible to gain minimum transmission power by which a response can be obtained with a slow transmission speed. Furthermore, when it is desired that transmission is performed with a faster speed, the transmission speed is further changed (made faster) to gain minimum transmission power by which a response can be obtained. As the transmission speed is made faster, the minimum transmission power by which a response can be obtained may become larger. It is not preferable to have the minimum transmission power to be too large even though the transmission speed is made faster. Therefore, for example, it is conceivable that a maximum value of permissible transmission power is held as permissible value information for each of transmission/reception speeds. By the determination at Step S46, it is determined using the permissible value information as to whether a combination between a transmission/reception speed by which a response has been obtained and transmission power is permissible.

Furthermore, when the communication apparatus 1 operates as a subscriber, it is possible to configure that the communication apparatus 1 transmits a status message having stored therein an identifier of the apparatus itself and the number of received chunks at every predetermined period of time. The status message can be transmitted to a publisher and can be transmitted by multicast. When the status message is transmitted by multicast, as the publisher and the subscriber receive the status message and hold the number of received chunks for every transmission-source apparatus, reception statuses of neighboring communication apparatuses 1 can be detected. Accordingly, for example, when a data message is transmitted by the transmission control described above as a response to a repair message, if the number of received chunks of the communication apparatus 1 of the transmission source of the repair message is equal to or less than a predetermined value, control of increasing transmission power can be executed.

In the above descriptions, transmission control in a case of transmitting a repair message has been explained. However, the first embodiment is not limited thereto, and when a message other than a repair message is transmitted, as long as it is transmission of a message that can be responded to, the same transmission control can be executed. Furthermore, when a data message is transmitted at the time of retransmitting a response to a repair message, the same transmission control can be executed. In this case, a subscriber having received normally a data message as a response to a repair message responds to the data message. Alternatively, the transmission power and/or transmission speed when a transmission source of a repair message transmits the repair message is stored in the repair message. It is possible to configure that a communication apparatus 1 that responds to the repair message transmits a data message using the transmission power and/or transmission speed stored in the repair message. Furthermore, transmission control of the transmission power and transmission speed can be executed in both cases of retransmitting a repair message and transmitting a data message. Further, the same transmission control can be executed when messages of other types are transmitted.

As described above, in the first embodiment, when a repair message is transmitted, the transmission power is controlled so that the transmission power is decreased within an area where a response can be obtained. Alternatively, the transmission speed is controlled so that a repair message is transmitted with a maximum transmission speed within an area where a response can be obtained. Still alternatively, both of the transmission power and the transmission speed are controlled. Accordingly, the influence of interference is reduced. Furthermore, when the transmission power is controlled, achievement of lower power consumption can be also expected. Further, as compared to a case where the communication apparatus 1 transmits messages in a time-division manner, the number of opportunities of transmission can be increased and effective data transfer can be performed.

Second Embodiment

Next, the communication apparatus 1 according to a second embodiment is explained. The configuration of the communication apparatus 1 according to the second embodiment is identical to that of the first embodiment. Elements different from the first embodiment are explained below.

In the first embodiment, as transmission control, an example in which transmission power control and transmission speed control are executed has been explained. In the second embodiment, as transmission control, an example in which control of changing a frequency is executed is explained. When a plurality of communication apparatuses 1 performs transmission using the same frequency band, there is a possibility that interference of a radio wave occurs. Particularly, when the communication apparatuses 1 are mobile terminals, these apparatuses may move, so that there is a possibility that the status of the reachable area of a radio wave changes with time. Therefore, when transmission power and transmission speed are controlled, interference may be unavoidable. Accordingly, among communication apparatuses 1 having adjacent reachable areas of a radio wave, by using different frequencies (channels), interference is avoided even when the reachable areas of a radio wave change to some extent.

At the time of transmitting a repair message, it is possible to decide the transmission power and/or transmission speed by executing the control of the transmission power and/or transmission speed described in the first embodiment after executing the frequency control described above. Alternatively, the frequency control can be executed after executing the control of the transmission power and/or transmission speed.

The wireless interface 4 is assumed to be capable of using a plurality of channels of one or more frequency band. The wireless interface 4 performs transmission using any one of the plurality of channels. As a method of using different channels among communication apparatuses 1 having adjacent reachable areas of a radio wave, there are many methods such as a method in which channels to be used are allocated in advance, and any method can be used. In this example, as a method of using different channels that is simple and realized in a distributed manner, there is explained a method in which, before the communication apparatuses 1 themselves perform transmission, whether channels to be transmitted are used is checked, and the channels to be used are changed when they are already used.

Figure 10:
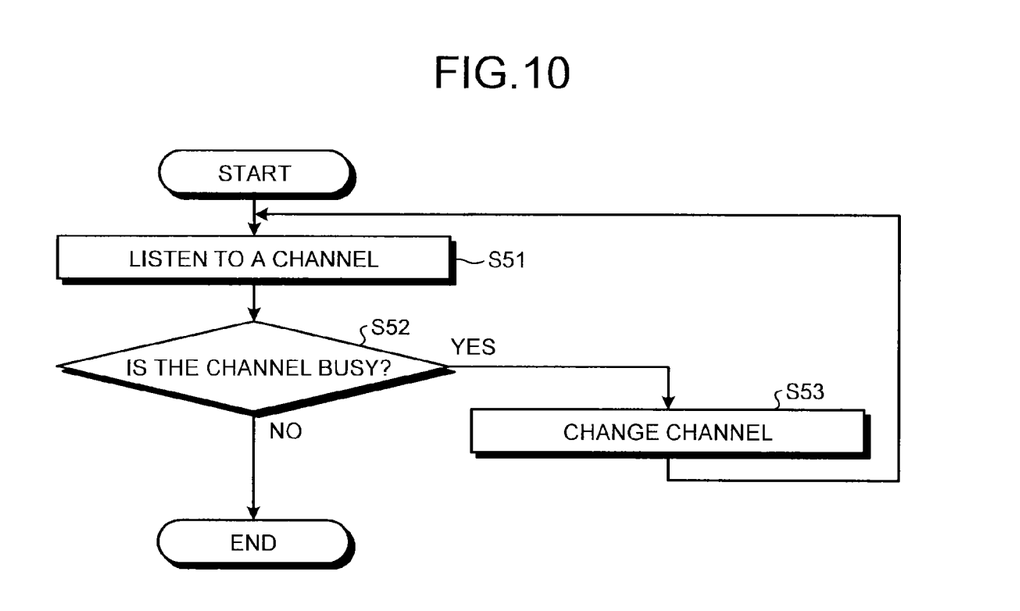
FIG. 10 is a diagram illustrating an example of a channel control procedure in a second embodiment when a repair message is transmitted.

FIG. 10 is a diagram illustrating an example of a channel control procedure in the second embodiment when a repair message is transmitted. First, before transmitting a repair message, the transmission control unit 6 selects one channel among usable n channels (n is an integer of 2 or more), and a reception status of a radio wave in the selected channel is checked (Step S51). Based on the result at Step S51, the transmission control unit 6 determines whether the selected channel is used by other apparatuses (Step S52). When the selected channel is used by other apparatuses (Yes at Step S52), the channel to be used is changed (Step S53), and the process returns to Step S51. Even when all the channels from a channel 1 to a channel n are changed, if all the channels are being used, it is checked once again whether these channels are used in the order from the channel 1.

When the selected channel is not used by other apparatuses (No at Step S52), the transmission control unit 6 decides that transmission is performed by the selected channel and channel control is ended. Thereafter, the transmission control unit 6 instructs the wireless interface 4 to perform transmission of repair messages with the decided channel. When the transmission is performed, there is a possibility that other neighboring communication apparatuses 1 perform the same channel control, and a channel that transmits the same channel is selected simultaneously. Therefore, to avoid such collision of transmission, it is possible to configure that the communication apparatuses wait for a random time when these apparatuses perform transmission.

Figure 11:
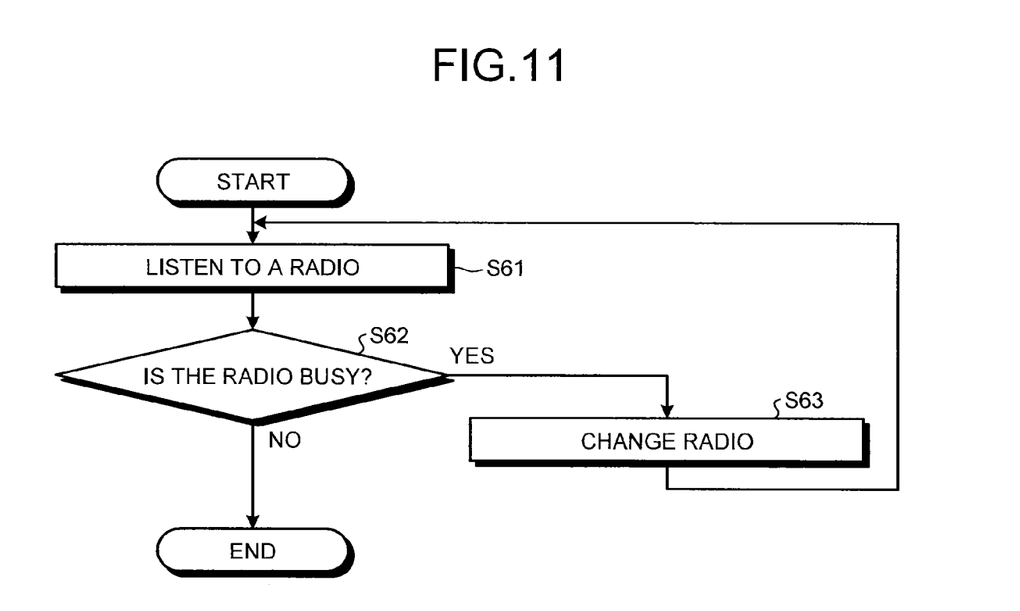
FIG. 11 is a diagram illustrating an example of a wireless-communication-system control procedure in the second embodiment when a repair message is transmitted.

Furthermore, in the example described above, as a method of changing frequencies, there has been explained a method of changing a channel used by the same communication systems. When the wireless interface 4 can employ a plurality of communication systems (such as a 2.4-GHz band of a wireless LAN (Local Area Network), 5-GHz band of a wireless LAN, and Bluetooth®), as the method of changing frequencies, it is conceivable to change the wireless communication system. FIG. 11 is a diagram illustrating an example of a wireless-communication-system control procedure in the second embodiment when a repair message is transmitted. First, before transmitting a repair message, the transmission control unit 6 selects one of usable communication systems and checks whether a radio wave is received by the selected communication system (Step S61). Based on the result at Step S61, the transmission control unit 6 determines whether the selected communication system is used by other apparatuses (Step S62). When the selected communication system is used by other apparatuses (Yes at Step S62), the communication system to be used is changed (Step S63), and the process returns to Step S61.

When the selected communication system is not used by other apparatuses (No at Step S62), the transmission control unit 6 decides that transmission is performed by the selected transmission system, and transmission system control is ended. Thereafter, the transmission control unit 6 instructs the wireless interface 4 to perform transmission of repair messages with the decided communication system. At the time of the transmission, it can be performed after waiting for a random time.

Furthermore, when a plurality of communication systems can be employed, depending on the communication system, the transmission power or reachable area of a radio wave may vary. Accordingly, when the communication system is selected, control of decreasing the transmission power and the reachable area of a radio wave as much as possible can be executed. For example, the congestion status of communication is measured for all communication systems. Subsequently, when a plurality of communication system can be used (that is, other apparatuses are not using them), it is possible to employ a method in which a repair message is first transmitted with a communication system having less transmission power and smaller reachable area of a radio wave, and then the communication system is changed if any response is not obtained.

Figure 12:
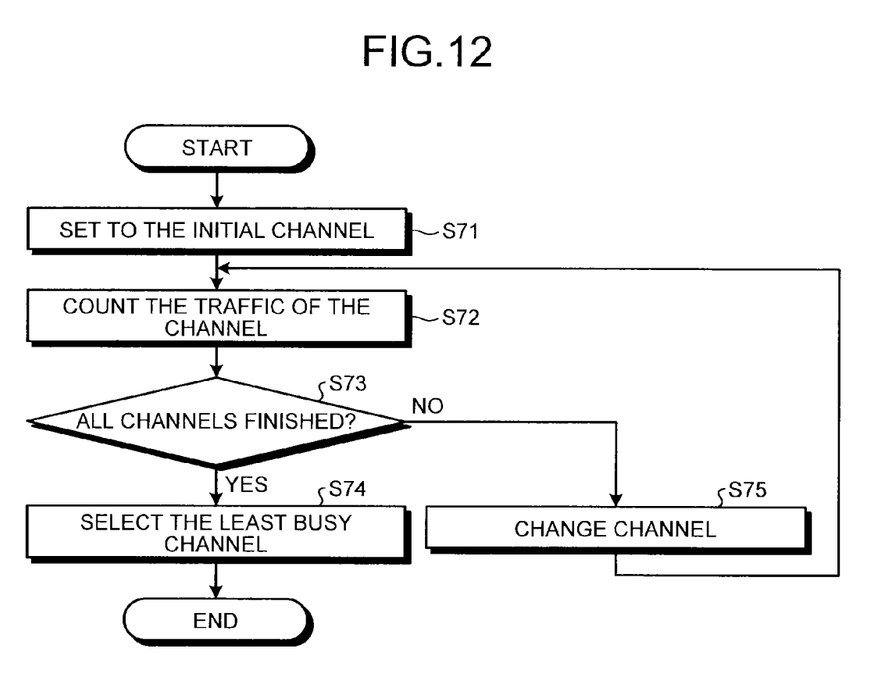
FIG. 12 is a diagram illustrating another example of the channel control procedure in the second embodiment when a repair message is transmitted.

Furthermore, while search of an idle channel is repeated until it is found in FIG. 10, there is also a method of selecting a channel with a least usage rate, even though it is not an idle channel. FIG. 12 is a diagram illustrating another example of a channel control procedure in the second embodiment when a repair message is transmitted. First, before transmitting a repair message, the transmission control unit 6 sets one channel among usable n channels (n is an integer of 2 or more) as an initial value (Step S71). The congestion degree of the set channel is then measured (Step S72). For example, the congestion degree can be a mean value of received power in a predetermined period of time, a peak value in a predetermined period of time, or an amount by which the use status of the channel can be ascertained. The transmission control unit 6 holds the measurement result while associating the result with the channel. The transmission control unit 6 determines whether all the channels have been measured (Step S73). When all the channels have been measured (Yes at Step S73), a channel with a least value of the measurement result (the least congested channel) is selected as the channel to be used for transmission (Step S74).

When there is any channel that has not been measured yet (No at Step S73), the channel to be set is changed (Step S75), and the process returns to Step S72. Similarly, as for the selection of the communication system, it is possible to select a least congested communication system.

As described above, in the second embodiment, when a repair message is transmitted, transmission is performed as the frequency is controlled and an available frequency is used. Accordingly, the influence of interference can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a wireless interface unit that performs transmission and reception of a message with outside of the communication apparatus;
   an operation-mode storing unit that stores an information related to operation mode of the communication apparatus, the operation mode including publisher mode and subscriber mode;
   an identification-information storing unit that stores a first identifier indicating that the communication apparatus belongs to a first group;
   a message processing unit that generates a message that is transmitted by the wireless interface unit, and analyzes a message that is received by the wireless interface unit;
   a transmission-power decision unit that decides transmission power when the wireless interface unit transmits a message; and
   a nonvolatile memory, wherein
   when the communication apparatus is determined to be a publisher based on a mode stored in the operation-mode storing unit, the message processing unit generates a transmission message including the first identifier to be output by the wireless interface unit to outside of the communication apparatus using first transmission power,
   when the communication apparatus is determined to be a subscriber based on a mode stored in the operation-mode storing unit, the message processing unit analyzes whether the reception message received by the wireless interface unit includes the first identifier, and stores data included in the reception message when the first identifier is included in the reception message, and does not store data included in the message when it is determined that the first identifier is not included in the reception message, and
   when the communication apparatus is a subscriber and when at least a part of the reception message cannot be received, a repair message for requesting retransmission of at least a part of the reception message is output from the wireless interface unit to outside of the communication apparatus using second transmission power, and when there is no response from outside of the communication apparatus to the repair message, the repair message is output from the wireless interface unit to outside of the communication apparatus using third transmission power that is larger than the second transmission power.

2. The communication apparatus according to claim 1, wherein when there is no response from outside of the communication apparatus to the repair message that is transmitted using the third transmission power, a transmission process of transmitting the repair message using another transmission power generated by increasing transmission power and a response confirmation process of determining whether there is a response from outside of the communication apparatus to the repair message are repeated, and when it is determined by the response confirmation process that there is a response, repetition of these processes is finished.

3. The communication apparatus according to claim 1, wherein the transmission-power decision unit further decides a transmission speed when the repair message is transmitted based on whether a response to the repair message has been received.

4. The communication apparatus according to claim 3, wherein
   a plurality of candidate values of the transmission speed is held, a repair message is output from the wireless interface unit to outside of the communication apparatus for each of the candidate values using second transmission power, when there is no response from outside of the communication apparatus to the repair message, the repair message is output from the wireless interface unit to outside of the communication apparatus using third transmission power that is larger than the second transmission power, when there is no response from outside of the communication apparatus to the repair message that is transmitted using the third transmission power, a transmission process of transmitting the repair message using another transmission power generated by increasing transmission power and a response confirmation process of determining whether there is a response from outside of the communication apparatus to the repair message are repeated, and when it is determined by the response confirmation process that there is a response, the transmission power used in the process is designated as minimum transmission power, and
   the transmission-power decision unit selects, from combinations of the candidate values and the minimum transmission power, a combination between a transmission speed and transmission power when the repair message is transmitted.

5. The communication apparatus according to claim 1, wherein the transmission-power decision unit further decides a frequency when the repair message is transmitted based on whether a response to the repair message has been received.

6. A communication apparatus comprising:
- a wireless interface unit that performs transmission and reception of a message with outside of the communication apparatus;
- an operation-mode storing unit that stores an information related to operation mode of the communication apparatus, the operation mode including publisher mode and subscriber mode;
- an identification-information storing unit that stores therein a first identifier indicating that the communication apparatus belongs to a first group;
- a message processing unit that generates a message that is transmitted by the wireless interface unit, and analyzes a message that is received by the wireless interface unit;
- a transmission-speed decision unit that decides a transmission speed when the wireless interface unit transmits a message; and
- a nonvolatile memory, wherein
- when the communication apparatus is determined to be a publisher based on a mode stored in the operation-mode storing unit, the message processing unit generates a transmission message including the first identifier to be output by the wireless interface unit to outside of the communication apparatus,
- when the communication apparatus is determined to be a subscriber based on a mode stored in the operation-mode storing unit, it is determined whether the first identifier is included in a reception message received by the wireless interface unit, the message processing unit analyzes whether the reception message received by the wireless interface unit includes the first identifier, and stores data included in the reception message when the first identifier is included in the reception message, and does not store data included in the message when it is determined that the first identifier is not included in the reception message, and
- when the communication apparatus is a subscriber and when at least a part of the reception message cannot be received, a repair message for requesting retransmission of at least a part of the reception message is output from the wireless interface unit to outside of the communication apparatus using a first transmission speed, and when there is no response from outside of the communication apparatus to the repair message, the repair message is output from the wireless interface unit to outside of the communication apparatus using a second transmission speed that is slower than the first transmission speed.

7. The communication apparatus according to claim 6, wherein when there is no response from outside of the communication apparatus to the repair message that is transmitted using the second transmission speed, a transmission process of transmitting the repair message using another transmission speed generated by reducing a transmission speed and a response confirmation process of determining whether there is a response from outside of the communication apparatus to the repair message are repeated, and when it is determined by the response confirmation process that there is a response, repetition of these processes is finished.

8. The communication apparatus according to claim 1, wherein a frequency not used for transmission by other communication apparatuses is searched from a plurality of usable frequencies, and a frequency obtained by the search is designated as a frequency when the repair message is transmitted.

9. The communication apparatus according to claim 1, wherein, as for a plurality of usable frequencies, a congestion degree is measured for each of the frequencies, and a frequency when the repair message is transmitted is decided based on the congestion degree.

10. The communication apparatus according to claim 1, wherein a communication system not used for transmission by other communication apparatuses is searched from a plurality of usable communication systems, and a communication system obtained by the search is designated as a communication system when the repair message is transmitted.

11. The communication apparatus according to claim 1, wherein, as for a plurality of usable communication systems, a congestion degree is measured for each of the communication systems, and a communication system when the repair message is transmitted is decided based on the congestion degree.

12. The communication apparatus according to claim 6, wherein a frequency not used for transmission by other communication apparatuses is searched from a plurality of usable frequencies, and a frequency obtained by the search is designated as a frequency when the repair message is transmitted.

13. The communication apparatus according to claim 6, wherein, as for a plurality of usable frequencies, a congestion degree is measured for each of the frequencies, and a frequency when the repair message is transmitted is decided based on the congestion degree.

14. The communication apparatus according to claim 6, wherein a communication system not used for transmission by other communication apparatuses is searched from a plurality of usable communication systems, and a communication system obtained by the search is designated as a communication system when the repair message is transmitted.

15. The communication apparatus according to claim 6, wherein, as for a plurality of usable communication systems, a congestion degree is measured for each of the communication systems, and a communication system when the repair message is transmitted is decided based on the congestion degree.

16. The communication apparatus according to claim 6, wherein, in a case where the communication apparatus is a subscriber, upon reception of a repair message from outside, when data for which retransmission is requested by the repair message is stored in the nonvolatile memory, the data is read from the nonvolatile memory, a message having the data stored therein is generated and output to the wireless interface unit, and the message is output from the wireless interface unit to outside of the communication apparatus.

17. A communication method in a communication apparatus including a nonvolatile memory, comprising:
- storing an information related to operation mode of the communication apparatus, the operation mode including publisher mode and subscriber mode; and
- storing a first identifier indicating that the communication apparatus belongs to a first group, wherein
- when the communication apparatus is determined to be a publisher based on a stored mode, the communication apparatus generates a transmission message including the first identifier to be output as a wireless signal to outside of the communication apparatus using first transmission power, and
- when the communication apparatus is determined to be a subscriber based on a stored mode, the communication apparatus analyzes whether the reception message includes the first identifier, and stores data included in the message when the first identifier is included in the reception message, and does not store data included in the message when the first identifier is not included in the reception message, and when the communication apparatus is determined to be a subscriber based on a stored mode and when at least a part of the reception message cannot be received, a repair message for requesting retransmission of at least a part of the reception message is output to outside of the communication apparatus using second transmission power, and when there is no response from outside of the communication apparatus to the repair message, the repair message is output to outside of the communication apparatus using third transmission power that is larger than the second transmission power.

18. A communication method in a communication apparatus including a nonvolatile memory, comprising:

storing an information related to operation mode of the communication apparatus, the operation mode including publisher mode and subscriber mode; and storing a first identifier indicating that the communication apparatus belongs to a first group, wherein when the communication apparatus is determined to be a publisher based on a stored mode, the communication apparatus generates a transmission message including the first identifier to be output as a wireless signal to outside of the communication apparatus using first transmission power, and when the communication apparatus is determined to be a subscriber based on a stored mode, the communication apparatus analyzes whether the reception message includes the first identifier, and stores data included in the message when the first identifier is included in the reception message, and does not store data included in the message when the first identifier is not included in the reception message, and when the communication apparatus is determined to be a subscriber based on a stored mode and when at least a part of the reception message cannot be received, a repair message for requesting retransmission of at least a part of the reception message is output to outside of the communication apparatus using a first transmission speed, and when there is no response from outside of the communication apparatus to the repair message, the repair message is output to outside of the communication apparatus using a second transmission speed that is slower than the first transmission speed.

* * * * *